United States Patent
Saito et al.

(10) Patent No.: US 6,763,077 B1
(45) Date of Patent: Jul. 13, 2004

(54) RECEIVING APPARATUS AND ARRAY COMBINING METHOD

(75) Inventors: Yoshiko Saito, Yokosuka (JP); Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 768 days.

(21) Appl. No.: 09/586,957

(22) Filed: Jun. 5, 2000

(30) Foreign Application Priority Data

Jun. 18, 1999 (JP) .......................................... 11-172293

(51) Int. Cl.$^7$ ................................................ H04B 1/10
(52) U.S. Cl. ........................ 375/349; 375/229; 375/267
(58) Field of Search ................................. 375/229, 230, 375/231, 232, 233, 234, 235, 236, 260, 267, 316, 340, 341, 347, 349, 350; 708/300, 301, 319, 322, 323; 333/18, 28 R; 455/303, 307

(56) References Cited

U.S. PATENT DOCUMENTS

| | | | | |
|---|---|---|---|---|
| 3,633,107 A | * | 1/1972 | Brady ......................... | 375/267 |
| 5,646,958 A | * | 7/1997 | Tsujimoto .................... | 375/233 |
| 5,689,528 A | * | 11/1997 | Tsujimoto .................... | 375/233 |
| 5,844,951 A | * | 12/1998 | Proakis et al. ............... | 375/347 |
| 6,240,149 B1 | * | 5/2001 | Yukitomo et al. ........... | 375/347 |

FOREIGN PATENT DOCUMENTS

JP          10336083          12/1998

OTHER PUBLICATIONS

K. Fukawa, "A Spatio–Temporal Equalization Technique in High Speed Digital Mobile Communications—An Adaptive Array–MLSE Cascading Connection for Sparse Channel Signal Combining," IEICE General Conference 1999, B-5-41, with partial English translation of pertinent portion.

* cited by examiner

*Primary Examiner*—Chieh M. Fan
(74) *Attorney, Agent, or Firm*—Stevens, Davis, Miller & Mosher, LLP (57) ABSTRACT

A switch 404 sends an output of a reception processing section 402 to a training processing section 405 at a training processing time and to a demodulation processing section 407 by control of a timing control section 403. The training processing section 405 passes received signals through FFFs for the respective branches to perform array combination at the training processing time. A tap coefficient converting section 406 converts the tap coefficient of FFF estimated by the training processing section 405 to calculate a weighting factor. The demodulation processing section 407 weights the received signals using the calculated weighting factor to combine, and passes the combined signal through FFF. This makes it possible to reduce the amount of operations at the array combining time.

7 Claims, 10 Drawing Sheets

RECEIVING APPARATUS AND ARRAY COMBINING METHOD

BACKGROUND OF THE INVENTION

1. Field of the Invention

The present invention relates to a receiving apparatus having an adaptive array antenna and relates to an array combing method.

2. Description of the Related Art

Figure 1:
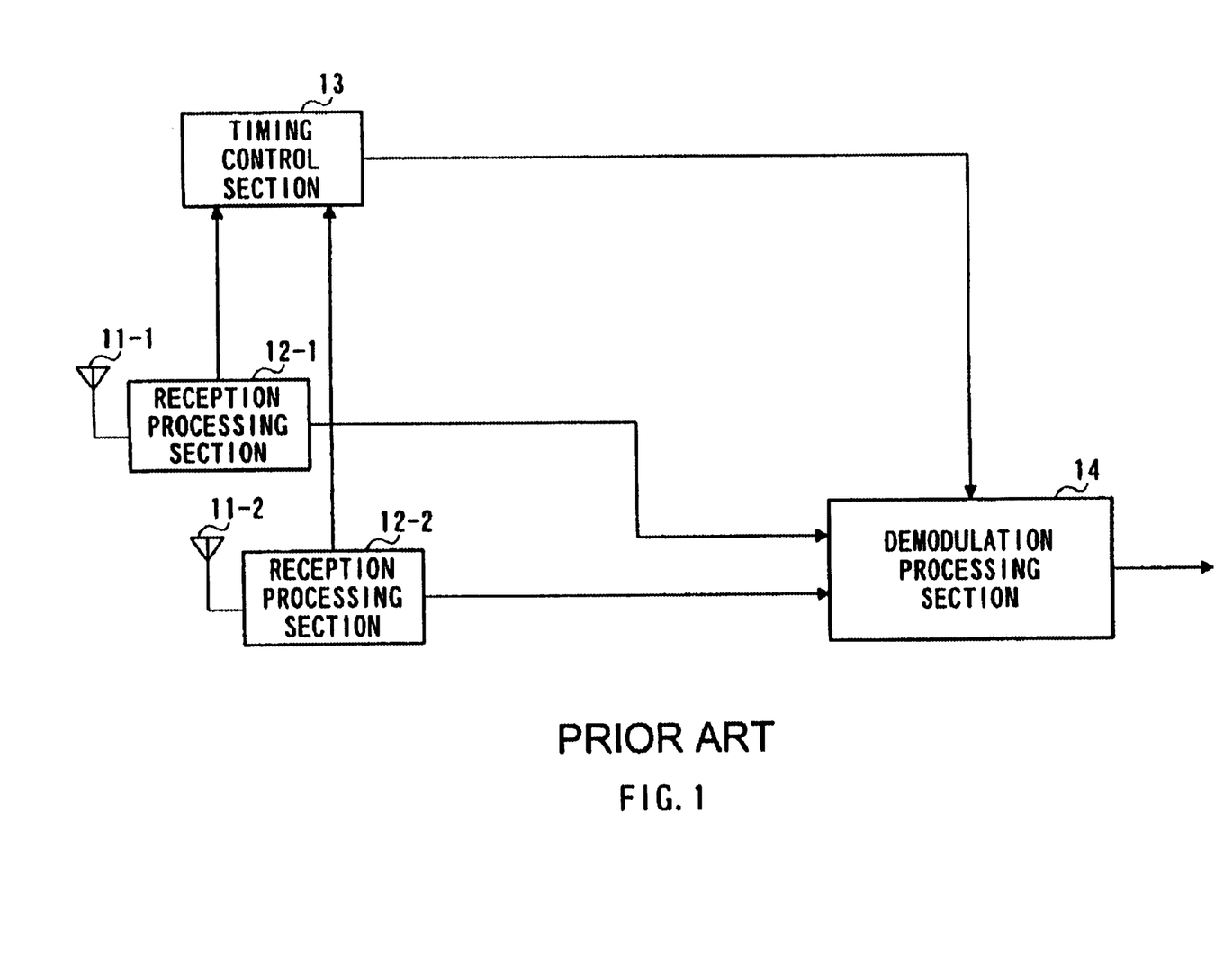
FIG. 1 is a primary block diagram 1 showing a schematic configuration of a conventional receiving apparatus.

The following will explain a convention receiving apparatus. FIG. 1 is a primary block diagram showing a schematic configuration of the conventional receiving apparatus. In the explanation set forth below, it is assumed that the number of branches is two.

In FIG. 1, antenna elements 11-1 and 11-2 are provided on a branch-by-branch basis to receive radio signals. Reception processing selections 12-1 and 12-2 are provided on a branch-by-branch basis to perform reception processing with respect to received signals. A timing control selection 13 acquires symbol synch timing to perform control of synch timing in the apparatus. A demodulation processing section 14 performs training processing and tracking processing with respect ti the output signals of reception processing sections 12-1 and 12-2.

Figure 2:
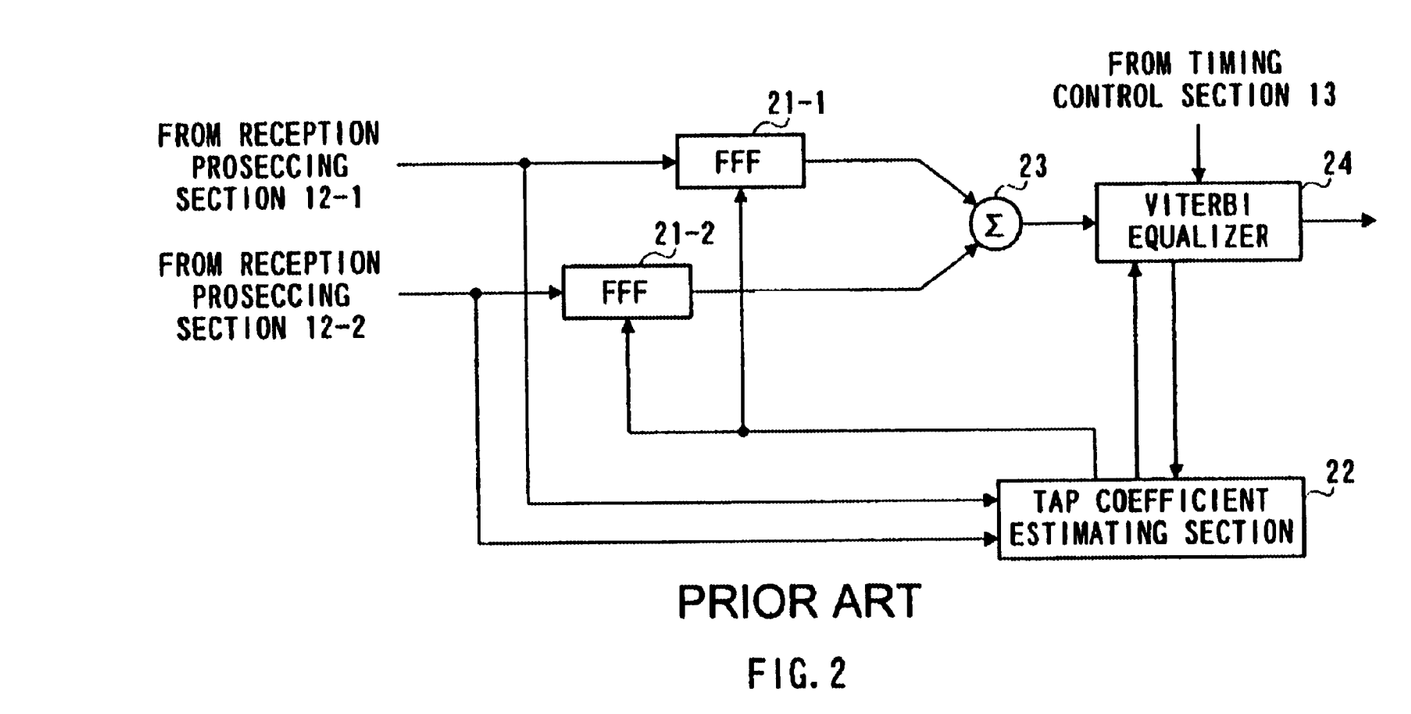
FIG. 2 is a primary block diagram,showing a schematic configuration of a demodulation processing section of the conventional .receiving apparatus.

A configuration of demodulation processing section 14 will be explained with reference to FIG. 2. FIG. 2 is a primary block diagram showing a schematic configuration of demodulation, processing section 14 of the conventional receiving apparatus.

In FIG. 2, FFFs (Feed Forward Filter) 21-1 and 21-2 are provided on a branch-branch basis to absorb timing jitter and synch shift. A tap coefficient estimating section 22 estimates tap coefficients of FFFs 21-1 and 21-2 based on a result of equalization processing made by a Viterbi equalizer 24 to be described later.

A combing device 23 combines the received signals of the respective branches output from FFF 21. The Viterbi equalizer 24 provides equalization processing with a Viterbi algorithm to the received signals combined by the combing device 23 based on the symbol synch timing acquired by the timing control section 13. Since this equalization processing is already known, the specific explanation will be omitted.

Thus, the conventional receiving apparatus passes the received signal through FFF every branch in the first part of array combine processing to update the tap coefficient of the FFF adaptively, thereby absorbing timing jitter and synch shift.

However, the conventional receiving apparatus has FFF every branch, and this causes a problem in which the amount of operations is increased so that much converging time for tap coefficient is required.

SUMMARY OF THE INVENTION

It is an object of the present invention to provide a receiving apparatus in which the amount of operations is small and converging time for tap coefficient is short, and to provided, the array combing method.

The present invention calculates a weighting factor from a tap coefficient estimated by training processing, assigns weights to the received signals of the respective branches using the calculated weighting factor to combine these signals, and passes the combined signal through FFF, whereby achieving the above object.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

First, the correlation between received signals of the respective branches in linear arrays arranged at intervals of ½ wavelength ($\lambda/2$) will be explained with reference to FIG. 3. The linear arrays arranged at intervals of ½ wavelength are one of array shapes, which are frequency used.

Figure 3:
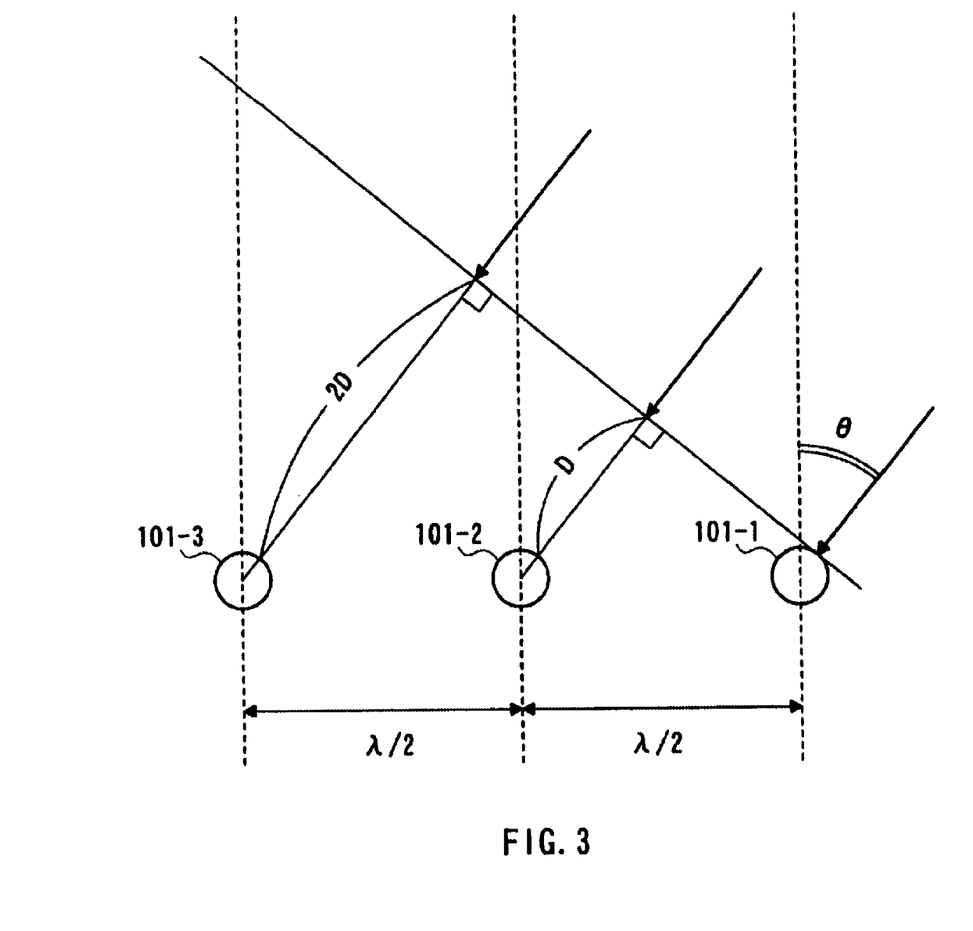
FIG. 3 is a view to explain a correlation between received signals.

As shown in FIG. 3, since the array interval is narrow, the respective array antenna elements 101-1, 101-2, and 101-3 receive the waves subjected to the same fading with a phase difference in accordance with an incident angle $\theta$. In other words, the phase differences of the respective waves are proportional to the respective channel differences (D and 2D in this embodiment), it can be considered that there is a correlation between the respective waves. Herein, a channel difference D can be expressed by $D=(\lambda/2) \sin \theta$.

Next, the following will explain array combine processing, which is a precondition for, the present invention, with reference to FIGS. 4A, 4B, FIG. 5A and FIG. 5B. Herein, it is assumed that the number of branches is 3, and that the number of taps for the respective FFFs, which are provided every branch, is one.

Figure 4A:
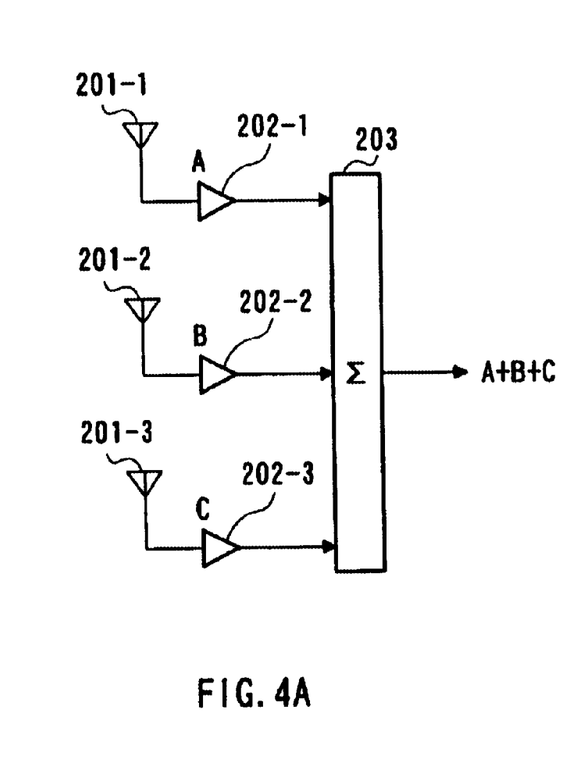
FIG. 4A is a view to explain array combine processing.

In FIG. 4A, paths, which are received by the respective array elements 201-1, 201-2, 201-3, are multiplied by tap coefficients "A", "B", and "C", which are calculated by training processing, by the corresponding taps 202-1, 202-2, 202-3. An adder 203 adds the respective paths by which the tap coefficients are multiplied.

Figure 4B:
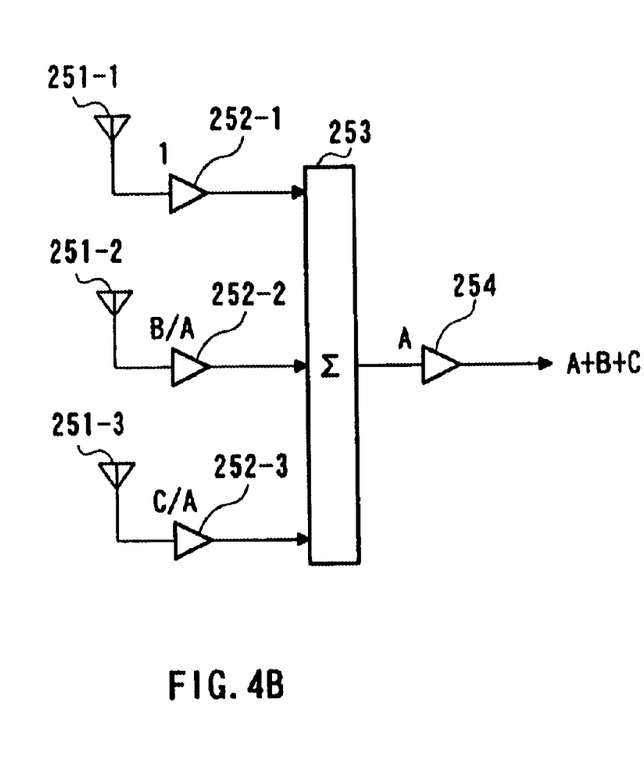
FIG. 4B is a view to explain array combine processing.

Here, if there is a correlation between the received signals of the respective branches, each of the tap coefficients "B" and "C" has an element of tap coefficient "A", so that the configuration shown by FIG. 4A can be also implemented by the configuration shown by FIG. 4B.

In FIG. 4B, paths, which are received by the array elements 251-1, 251-2, 251-3, are multiplied by tap coefficients "1", "B/A" and "C/A" by the corresponding taps 252-1, 252-2, 252-3, respectively. An adder 253 adds the respective paths by which the tap coefficients are multiplied, and a tap 254 multiplies the received signal subjected to addition processing by the tap coefficient "A". If there is a correlation between the respective paths, the output of tap 254 becomes the same output of adder 203 of FIG. 4A.

Next, the following will explain a case in which the number of branches is 2 and the number of taps of each FFF provided every branch is 3.

Figure 5A:
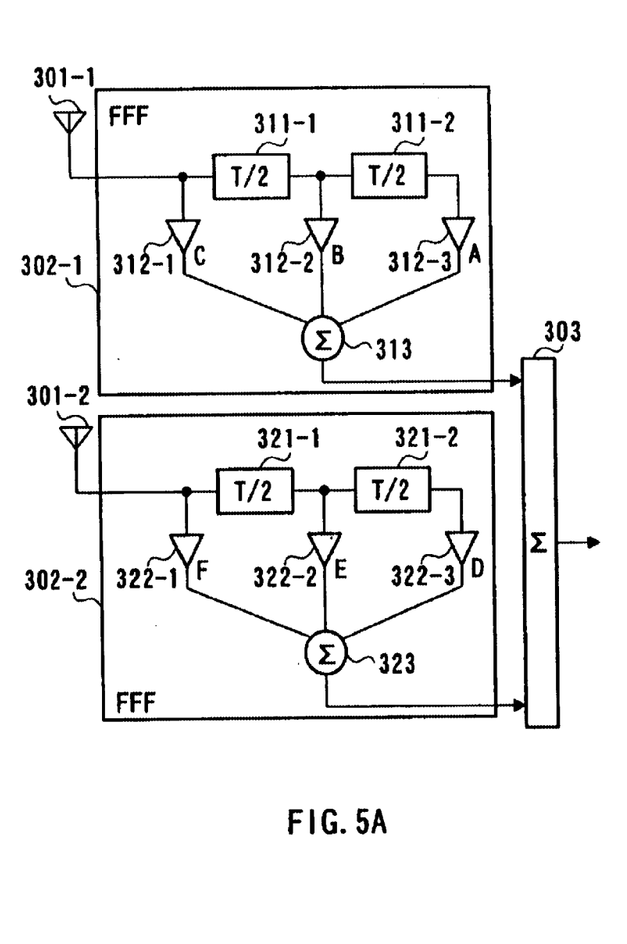
FIG. 5A is a view to explain array combine processing.

In FIG. 5A, the signals received by the respective array antenna elements 301-1 and 301-2 are added by an adder 303 after timing jitter and synch shift are absorbed by FFFs 302-1 and 302-2 provided every branch, respectively.

The FFF 302-1 for branch 1 comprises delay units 311-1 and 311-2 for extracting the respective delay waves, taps 312-1, 312-2, and 312-3 that multiply the respective received signal components by tap coefficients, and a combining device 313 that combines the respective components subjected to weight processing.

Similarly, the FFF 302-2 for branch 2 comprises delay units 321-1, and 321-2 for extracting the respective delay waves, taps 322-1, 322-2, and 322-3 that multiply the respective received signal components by tap coefficients, and a combining device 323 that combines the respective components subjected to weight processing.

In consideration of the case in which the number of taps is 3, taps 312-1 and 322-1 multiply T/2 delay wave by the tap coefficients, taps 312-2 and 322-2 multiply 0T delay wave by the tap coefficients, and taps 312-3 and 322-3 multiply −T/2 delay wave by the tap coefficients.

It is assumed that the tap coefficients of the taps 312-1, 312-2, 312-3 are "A", "B", land "C" in order, and that the tap coefficients of the taps 322-1, 322-2, 322-3 are "D", "E", and "F" in order.

Figure 5B:
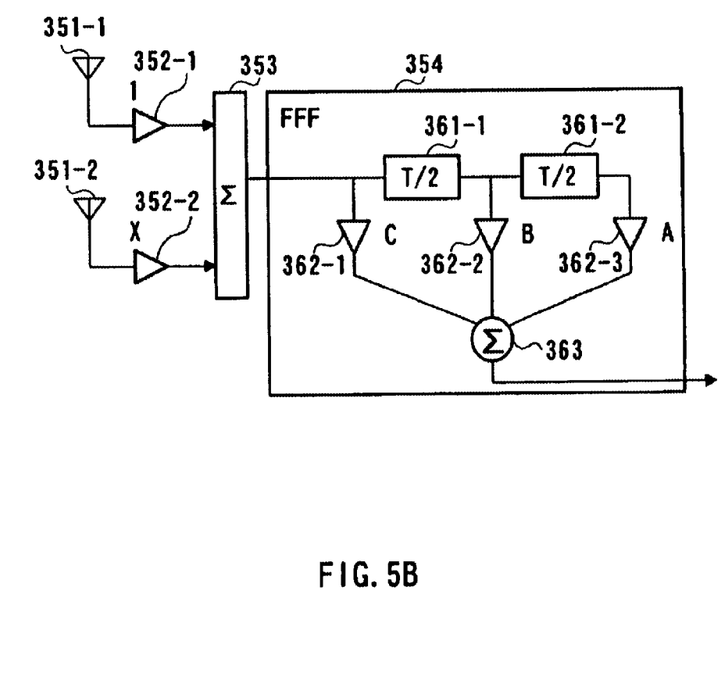
FIG. 5B is a view to explain array combine processing.

Here, if there is a correlation between the delay waves corresponding to the respective branches, namely, between the output of tap 312-1 and that of tap 322-1, the output of tap 312-2 and that of tap 322-2, the output of tap 312-3 and that of tap 322-3, respectively, the configuration shown in FIG. 5A can be also implemented by the configuration shown in FIG. 5B bashed on the application of examples shown in FIGS. 4A and 4B.

In FIG. 5B, tap 352-1 multiplies the signal, which is received by array antenna element 351-1, by tap coefficient "1." Tap 352-2 multiplies the signal, which is received by array antenna element 351-2, by tap coefficient "X."

Then, the outputs of tap 352-1 and tap 352-2 are added by an adder 353, and timing jitter and sync shift are absorbed by FFF 354.

The FFF 354 comprises delay units 361-1 and 361-2 for extracting delay waves, taps 362-1, 362-2, and 362-3 that multiply the respective received signal components by tap coefficients, and a combining device 363 that combines the respective components subjected to weight processing.

If the tap coefficients of taps 362-1, 362-2, and 362-3 are "A", "B", and "C" in order, there are three values, that is, "D/A", "E/B" and "F/C" as a tap coefficient "X" of tap 352-2, which equates the output of the combining device 363 with that of the adder 303. The maximum value of these three values or a value, which is obtained by weighting these three values in accordance with the level of values and adding the resultants, may be set.

This makes it possible to make the output of combining device 363 equal with that of the adder 303 of FIG. 5A.

Thus, if the tap coefficient is subjected to suitable conversion, the same output as the case in which the received signals for the respective branches are passed through FFF and combined can be obtained by weighting the received signals for the respective branches to combine and passing the combined signals through FFF. This makes it possible to reduce the amount of operations, which are necessary for updating the tap coefficient of FFF in adaptive control.

In the above explanation, the number of delay units in each of FFFs 302-1, 302-2 and FFF 354 was 2 and the amount of delay of each delay unit was T/2. However, according to the present invention, the number of delay units and the amount of each delay unit may be arbitrarily set.

The following will specifically explain the receiving apparatus in which a hardware scale is reduced by use of the principle of the above tap coefficient conversion. In the explanation set forth below, the number of branches is 2, and the number of taps of FFF is 3. However, this is just the example, and the present invention is not limited to this condition.

(First Embodiment)

According to the first embodiment, the training processing and tracking processing, which are conventionally performed at one time by the demodulation processing section, are processed by the different configuration, whereby improving a decrease in the hardware configuration used in tracking processing and a reduction in time required for estimating the tap coefficient.

Figure 6:
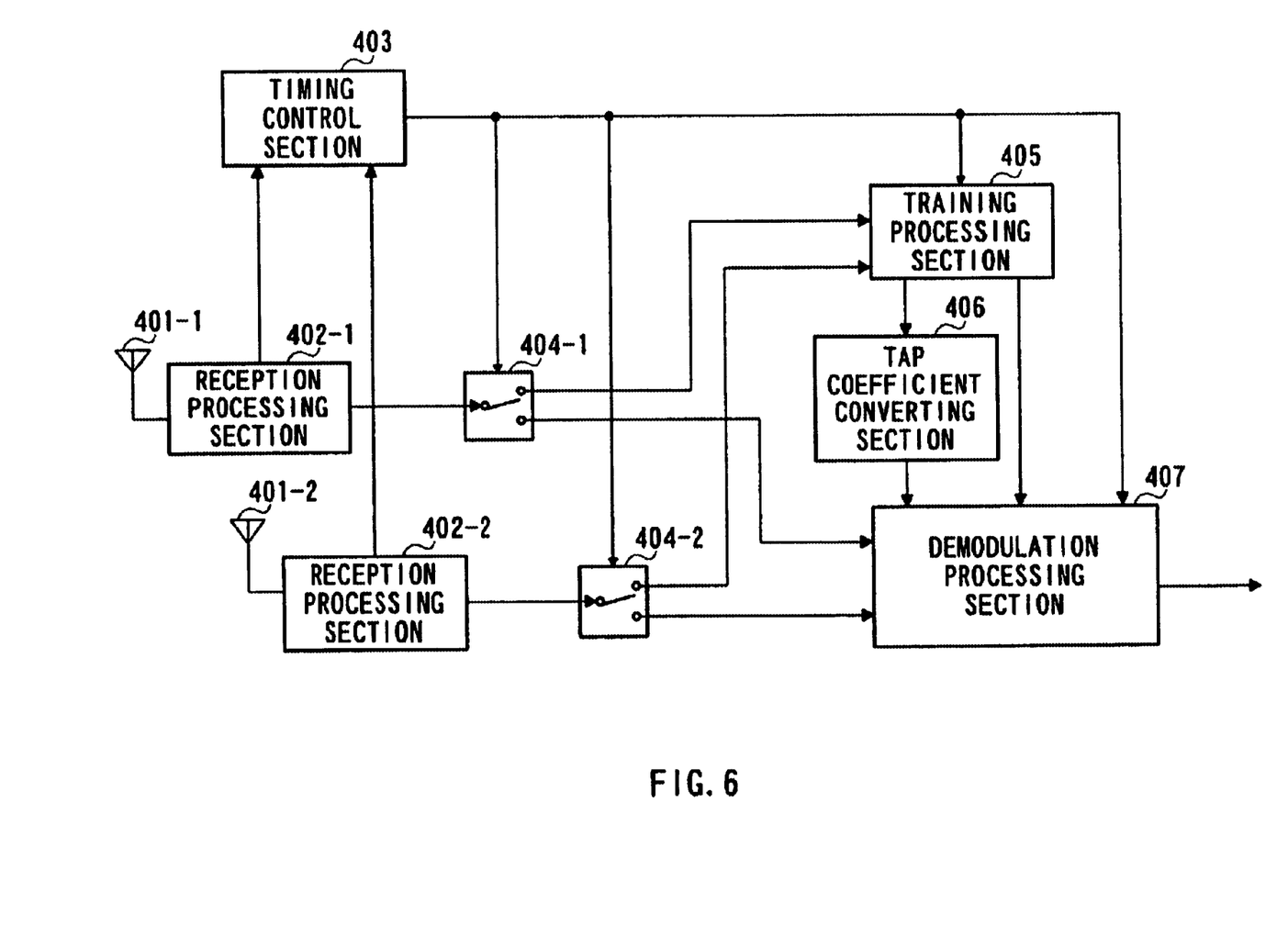
FIG. 6 is a primary block diagram showing a schematic configuration of a receiving, apparatus according to a first embodiment of the present invention.

The following will explain the receiving apparatus according to the embodiment of the present invention. FIG. 6 is a primary block diagram showing a schematic configuration of the receiving apparatus according the embodiment of the present invention.

In FIG. 6, array antenna elements 401-1 and 401-2 of an adaptive array antenna receive radio signals, respectively, and reception processing sections 402-1 and 402-2 perform, reception processing with respect to the signals received by the corresponding antenna elements 401-1 and 401-2.

A timing control section 403 acquires symbol synch timing, and performs control of synch timing in the apparatus.

Switches 404-1 and 404-2 send the outputs of reception processing sections 402-1 and 402-2 to a training processing section at a training processing time, and the outputs of reception processing sections 402-1 and 402-2 to a demodulation processing section 407 at a tracking processing time 405 by control of timing control section 403.

The training processing section 405 performs array combine processing and training processing with respect to the received signal. The details of training processing section 405 will be described later.

A tap coefficient converting section 406 converts a tap coefficient estimated by the training processing section 405, and sets a tap coefficient at the time of tracking processing in the demodulation processing section 407 to be described later.

Unlike the conventional demodulation processing section, the demodulation processing section 407 performs array combing processing and data demodulation processing with respect to the received signal at only the tracking processing time. The details of demodulation processing section will be described later.

Next, the configuration of training processing section 405 will be explained with reference to FIG. 7. The training processing section 405 performs array combing processing and training processing with respect to the received signal, and comprises FFFs 501-1, 501-2, tap coefficient estimating section 502, combining device 503, and Viterbi equalizer 504.

The FFFs 501-1 and 501-2 are provided every branch, and absorb timing jitter and synch shift from the output signals of switches 404-1 and 404-2. The FFF 501-1 uses the same configuration as that of FFF 302-1 shown in FIG. 5A. Namely, the FFF 501-1 comprises two delay units, three taps, and one combining device. The FFFs 501-1 and 501-2 are provided every branch, and absorb timing jitter and synch shift from the output signals of switches 404-1 and 404-2. The FFF 501-2 uses the same configuration as that of FFF 302-2 shown in FIG. 5A. Namely, the FFF 501-2 comprises two delay units, three taps, and one combining device.

The tap coefficient estimating section 502 estimates a tap coefficient of each of FFFs 501-2 and 501-2 and a tap coefficient of a replica generator (not shown), which is provided in the Viterbi equalizer 504.

The combining device 503 combines the received signals of the respective branches, and the Viterbi equalizer 504 performs equalization processing using a Viterbi algorithm. This equalization processing is already known and the specific explanation will be omitted.

Here, in FFF 501-1, it is assumed that a tap coefficient by which −T/2 delay wave is multiplied is "A", that a tap coefficient by which 0T delay wave is multiplied is "B", and that a tap coefficient by which T/2 delay wave is multiplied is "C." Similarly, in FFF 501-2, it is assumed that a tap coefficient by which −T/2 delay wave is multiplied is "D", that a tap coefficient by which 0T delay wave is multiplied is "E", and that a tap coefficient by which T/2 delay wave is multiplied is "F."

Then, it is assumed that the tap coefficient of FFF 501-1 is used as a tap coefficient of FFF in the tracking processing. The tap coefficient of one FFF in the training processing is directly used as a tap coefficient of FFF 704 in the tracking processing, and this allows the amount of operations to be reduced as compared with the case in which the tap coefficient is newly set.

As a result, tap coefficients "A", "B", and "C" are output to the tap coefficient converting section 406 and demodulation processing section 407. The tap coefficients "D", "E" and "F" of FFF 501-2 are also output to the tap coefficient converting section 406.

Figure 8:
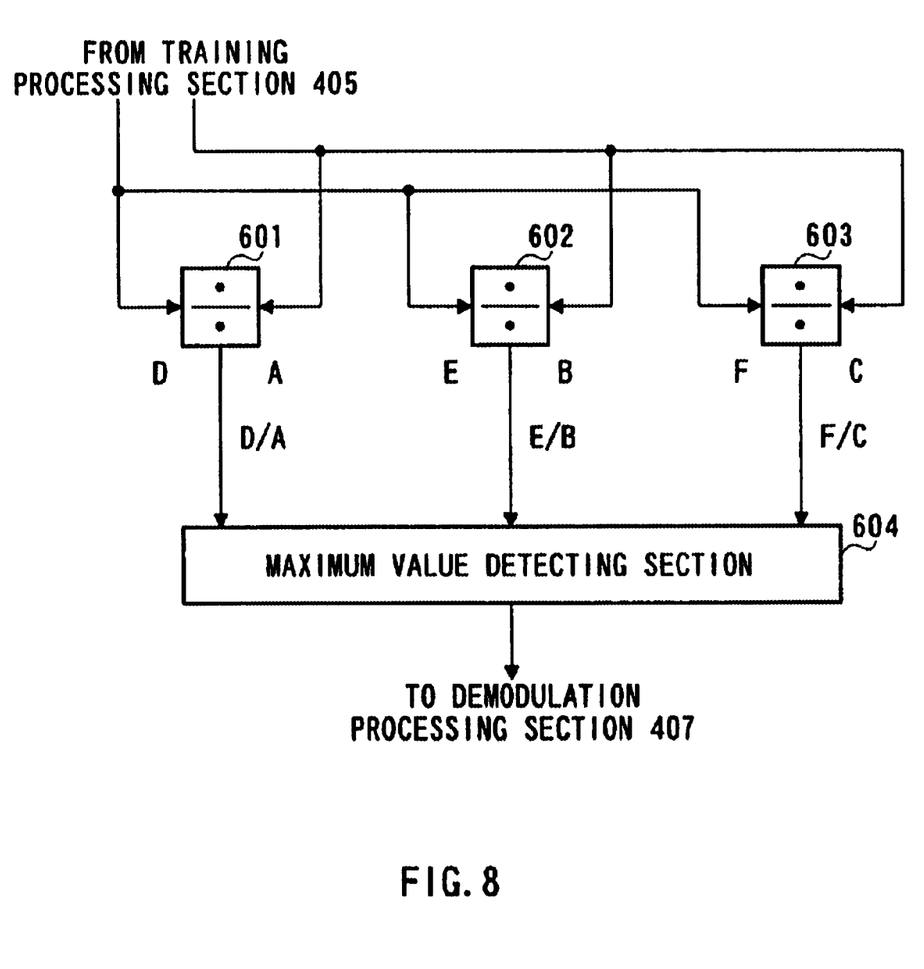
FIG. 8 is a primary block diagram showing a schematic configuration of a tap coefficient converting section according to the first embodiment of the present invention.

Next, the configuration of tap coefficient converting section 406 will be explained with reference to FIG. 8. As shown in FIG. 8, the tap coefficient converting section 406 comprises dividers 601 to 603, and a maximum value detecting section 604.

The dividers 601 to 603 divider the tap coefficients of FFF 501-2 by the tap coefficients of FFF 501-1, respectively. Namely, the divider 601 calculates "D÷A", the divider 602 calculates "E÷B", and the divider 603 calculates "F÷C."

The maximum value detecting section 604 detects the maximum value in the outputs (D/A, E/B, F/C) of dividers 601 to 603, and outputs only the maximum value to the demodulation processing section 407.

Figure 9:
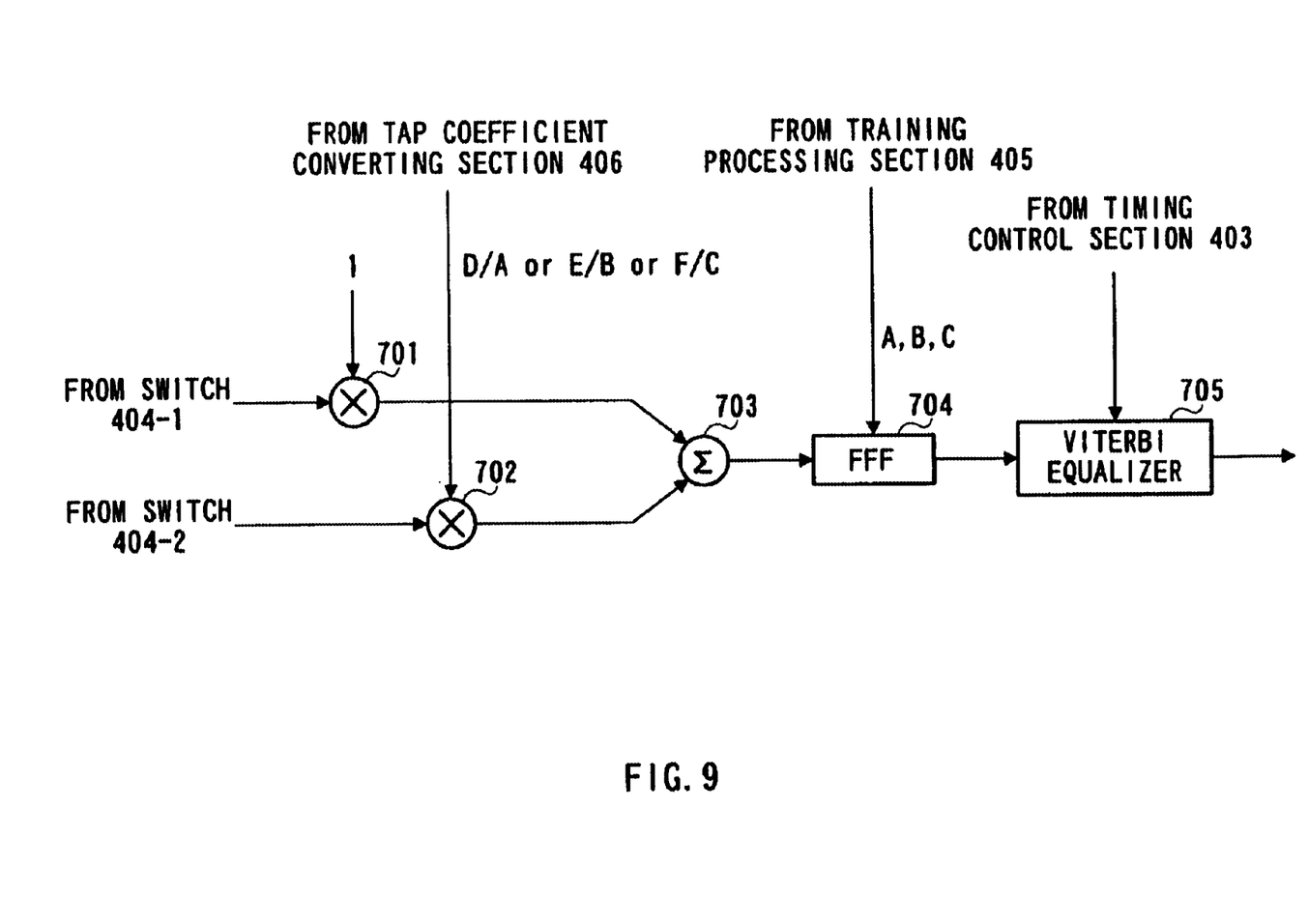
FIG. 9 is a primary block diagram showing a schematic configuration of a demodulation processing section of the receiving apparatus according to the first embodiment of the present invention.

Next, the configuration of demodulation processing section 407 will be explained with reference to FIG. 9. As shown in FIG. 9, the demodulation processing section 407, which performs tracking processing, comprises taps 701 and 702, combining device 703, FFF 704, and Viterbi equalizer 705. The demodulation processing section 407 performs FFF processing only one time after combining the respective received signals.

The taps 701 and 702 multiply the received signals of the respective branches, which are not combined yet, by the tap coefficient. The tap 701 provided in the branch 1 multiplies the received signal by a fixed value 1 as a tap coefficient, while the tap 702 provided in the branch 2 multiplies the received signal by a converted tap coefficient, which is output from the tap coefficient converting section 406. The combining device 703 combines the received signals multiplied by the tap coefficient.

The FFF 704 directly uses the tap coefficient of FFF 501-1 of branch 1 output from the training processing section 405, and absorbs timing jitter and synch shift from the received signal subjected to combine processing. The FFF 704 uses the same configuration as that of the FFF 354 shown in FIG. 5B. Namely, the FFF 501-1 comprises two delay units, three taps, and one combining device. The Viterbi equalizer 705 performs equalization processing with respect to the combined received signal using a Viterbi algorithm based on the symbol synch timing. This equalization processing is already known and the specific explanation will be omitted.

Next, the operation of the receiving apparatus having the above-mentioned configuration will be explained.

The radio signals received by the respective antenna elements 401-1 and 401-2 of the adaptive array antenna are received by reception processing sections 402-1 and 402-2, respectively, and symbol synch timing is acquired by the timing control section 403.

The switches 404-1 and 404-2 are switched by the timing control section 403, the known signal section of the received signal is passed through FFF every branch, and subjected to combining and Viterbi processing in the training processing section 405. The tap coefficient in FFF is estimated and updated appropriately (for example, on a slot-bly-slot basis) using a determined symbol sequence Candidate. Here, it is assumed that the tap coefficients estimated by the tap coefficient estimating section 502 are set to "A", "B", "C" for branch 1 and "D", "E", "F" for branch 2 through the entirety of the known signal section.

The estimated tap coefficients are output to the tap coefficient converting section 406 and demodulation processing section 407. In this case, it is assumed that the tap coefficients "A", "B", "C" for branch 1 are used as tap coefficients of FFF in the tracking processing.

When the training processing is ended, the weighting factor is set to the taps 701 and 702 of demodulation processing section 407 and the tap coefficient is set in FFF 704, and the tracking processing is started.

Here, since the tap coefficient at the training processing time for branch 1 is used in FFF 704, the weighting factor of tap 701, which is assigned to the received signal of branch 1, is set to 1. On the other hand, the weighting factor of tap 702, which is assigned to the received signal of branch 2, is set to the output value of tap coefficient converting section 406.

Then, in the tracking processing, the received signals of the respective branches are weighted by the taps 701 and 702 and combined by the combining device 703. The combined received signal is passed through FFF 704, and finally determined by the Viterbi equalizer 705.

Figure 7:
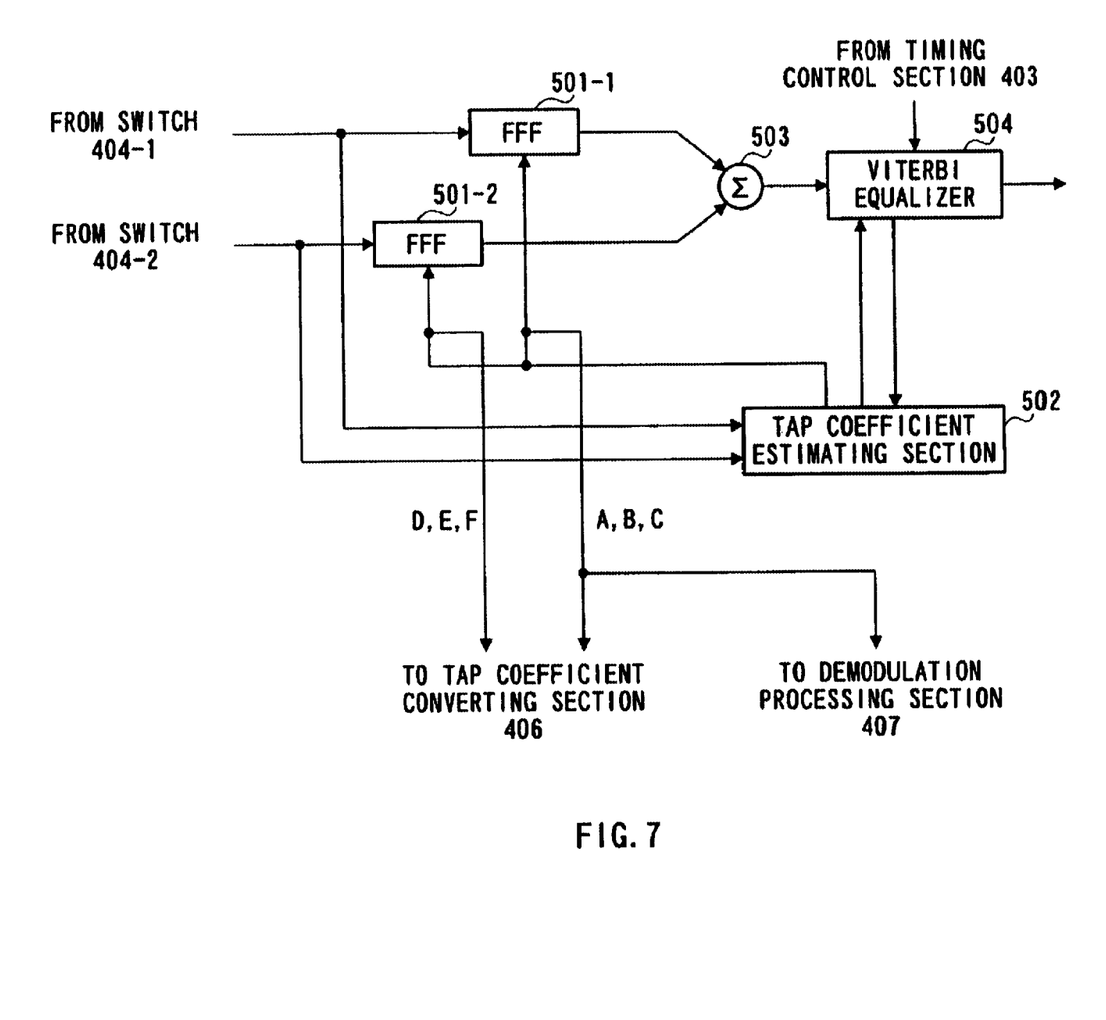
FIG. 7 is a primary block diagram showing a schematic configuration of a training processing section of the receiving apparatus according to the first embodiment of the present invention.

As mentioned above, the configurations of FFFs 501-1 and 501-2 in the training processing section 405 shown in FIG. 7 are equivalent to those of FFFs 302-1 and 302-2 shown in FIG. 5A. Moreover, the configuration of FFF 704 in the demodulation processing section 407 shown in FIG. 9 is equivalent to that of FFF 354 shown in FIG. 5B. Therefore, as shown in FIG. 9, regarding the tracking processing, the same output as that of the conventional case can be obtained even if the configuration in which the combined received signal is passed through FFF only one time is used.

Thus, according to the present invention, the received signals of the respective branches are weighted and combined and the combined signal is passed through FFF at the tracking processing time. Whereby, the amount of operations can be suppressed in the sum of products corresponding to the number of taps of array element+FFF as compared with the conventional case in which the sum of products corresponding to the number of taps of FFFs every array element×array element is conventionally required. Moreover, this makes it possible to solve the problem in which adaptive processing using LMS and RLS, which are linear operations, can not be employed even if FFFs for the respective array elements are attempted to be subjected to training processing in a lump later since the non-linear operation is included in the training processing.

(Second Embodiment)

The receiving apparatus according to this embodiment has the same configuration as that of the first embodiment. However, in this case, it is assumed that the output of tap coefficient converting section is a value that is obtained by weighting the divisional result every delay wave and combining these results.

Figure 10:
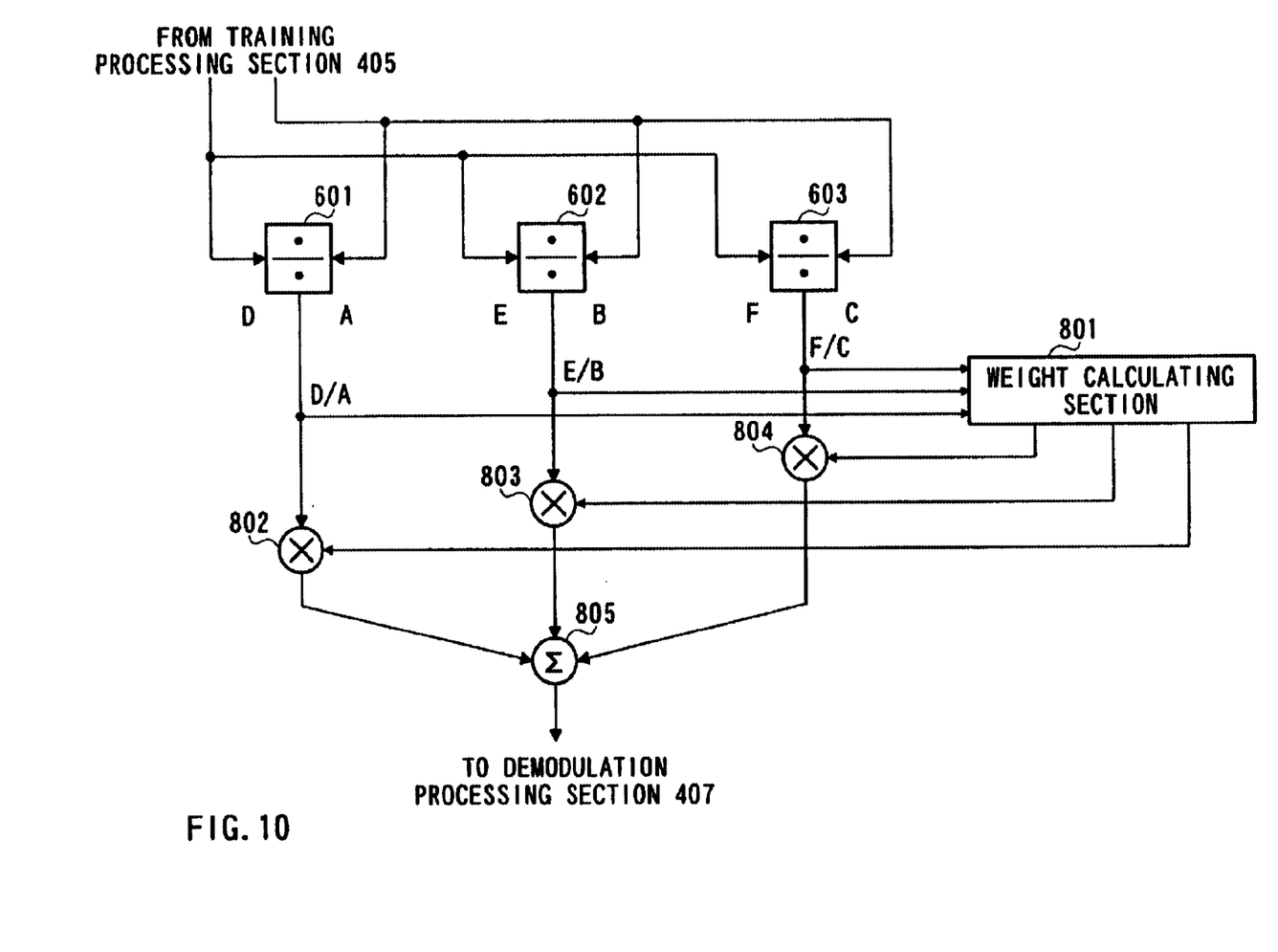
FIG. 10 is a primary block diagram showing a schematic configuration of a tap coefficient converting section according to a second embodiment of the present invention.

The following will explain they receiving apparatus according to this embodiment with reference to FIG. 10. FIG. 10 is a primary block diagram showing the schematic configuration of the tap coefficient converting section of the receiving apparatus according to the second embodiment of the present invention. In FIG. 10, the same reference numerals as those of FIG. 8 are added to the configuration components common to FIG. 8.

In FIG. 10, a weight calculating section 801 calculates coefficients in accordance with the level of the output value of each of the dividers 601 to 603, and outputs them to multipliers 802 to 304, respectively.

The multipliers 802 to 804 multiply the output values ("D/A", "E/B", and "F/C" in this case) of dividers 601 to 603 by the input weighting factors, respectively. An adder 805 adds the outputs of multipliers 802 to 804 and outputs them to the tap 702 of modulation processing section 407.

Thus, the tap coefficient estimated in the training processing is subjected to weighting processing so as to calculate the weighting factor for tracking processing time. This makes it possible to perform array combine processing in which a propagation state for each branch is reflected, with the result that SNR (Signal Noise Ratio) of the array combined output can be improved.

The above embodiment explained the case in which the number of branches was two and that of taps of FFF was three. The present invention is not limited to the above condition, that is, the present invention can be applied to any number of branches and any number of taps.

As explained above, according to the present invention, the received signals of the respective branches are weighted and combined and the combined signal is passed through FFF at the, tracking processing time. Whereby, the amount of operations can be suppressed in the sum of products corresponding to the number of taps of array element+FFF as compared with the conventional case in which the sum of products corresponding to the number of taps of FFFs every array element×array element is conventionally required. Moreover, this makes it possible to solve the problem in which adaptive processing using LMS and RLS, which are linear operations, can not be employed even if FFFs for the respective array elements are attempted to be subjected to training processing in a slump later since the non-linear operation is included in the training processing.

The present invention is not limited to the above described embodiments, and various variations and modifications may be possible without departing from the scope of the present invention.

This application is based on the Japanese Patent Application No. HEI 11-172293 filed on Jun. 18, 1999, entire content of which is expressly incorporated by reference herein.

What is claimed is:

1. A receiving apparatus comprising:
   a receiving section that receives signals at a plurality of branches;
   a first array combining section that passes the received signals from said plurality of branches through respective first feed forward filters different from each other and combines the filtered received signals at a training processing time;
   a second array combining section that weights the received signals from said plurality of branches, combines the weighted received signals, and passes the combined weighted received signal through one second feed forward filter, at a tracking processing time and a demodulation processing time; and
   a tap coefficient setting section that sets weighting factors of said second array combining section and tap coefficients of said second feed forward filter based on tap coefficients of one of said first feed forward filters estimated at the training processing time.

2. The receiving apparatus according to claim 1, wherein said tap coefficient setting section sets the tap coefficients of a selected first feed forward filter as the tap coefficients of the second feed forward filter and sets to 1, at the second array combining section, the weighting factor for the branch of said selected first feed forward filter.

3. The receiving apparatus according to claim 2, wherein:
   for each branch other than the branch whose weighting factor at the second array combining section is 1, said tap coefficient setting section calculates candidate values and sets a maximum candidate value as the weighting factor for said each branch;
   said candidate values are calculated by dividing the tap coefficients of the respective first feed forward filter for said each branch by the tap coefficients of the first feed forward filter for said branch whose weighting factor is 1; and
   for the respective first feed forward filter for said each branch, said tap coefficients are estimated on a per delay time basis by training processing.

4. The receiving apparatus according to claim 2, wherein:
   for each branch other than the branch whose weighting factor at the second array combining section is 1, said tap coefficient setting section weights candidate values, combines the weighted candidate values, and sets the combined weighted candidate value as the weighting factor for said each branch;
   said candidate values are obtained by dividing the tap coefficients of the respective first feed forward filter for said each branch by the tap coefficients of the first feed forward filter for the branch whose weighting factor is 1; and for the respective first feed forward filter for said each branch, said tap coefficients are estimated on a per delay time basis by training processing.

5. A communication terminal apparatus including a receiving apparatus, said receiving apparatus comprising:
- a receiving section that receives signals at a plurality of branches;
- a first array combining section that passes the received signals from said plurality of branches through respective first feed forward filters, different from each other, and combines the filtered received signals at a training processing time;
- a second array combining section that weights the received signals from said plurality of branches, combines the weighted received signals, and passes the combined weighted received signal through one second feed forward filter, at a tracking processing time and a demodulation processing time; and
- a tap coefficient setting section that sets a weighting factor of said second array combining section and tap coefficients of said second feed forward filter based on tap coefficients of one of said first feed forward filters estimated at the training processing time.

6. A base station apparatus including a receiving apparatus, said receiving apparatus comprising:
- a receiving section that receives signals at a plurality of branches;
- a first array combining section that passes the received signals from said plurality of branches through respective first feed forward filters, different from each other, and combines the filtered received signals at a training processing time;
- a second array combining section that weights the received signals from said plurality of branches, combines the weighted received signals, and passes the combined weighted received signal through one second feed forward filter, at a tracking processing time and a demodulation processing time; and
- a tap coefficient setting section that sets a weighting factor of said second array combining section and tap coefficients of said second feed forward filter based on tap coefficients of one of said first feed forward filters estimated at the training processing time.

7. An array combining method comprising the steps of:

receiving signals at a plurality of branches;

passing the received signals from said plurality of branches through respective first feed forward filters, different from each other, and combining the filtered received signals at a training processing time;

weighting the received signals from said plurality of branches based on tap coefficients, of one of said first feed forward filters, estimated at the training processing time;

combining the weighted received signals; and passing the combined weighted received signal through one second feed forward filter at a tracking processing time and a demodulation processing time.

* * * * *